(12) United States Patent
Kim (10) Patent No.: US 8,120,305 B2
(45) Date of Patent: Feb. 21, 2012

(54) METHOD FOR STARTING SINGLE PHASE INDUCTION MOTOR AND ELECTRONIC RELAY USING THE SAME

(76) Inventor: Young Jun Kim, Seoul (KR)

( * ) Notice: Subject to any disclaimer, the term of this patent is extended or adjusted under 35 U.S.C. 154(b) by 337 days.

(21) Appl. No.: 12/544,289

(22) Filed: Aug. 20, 2009

(65) Prior Publication Data

US 2011/0018486 A1    Jan. 27, 2011

(51) Int. Cl.
*H02P 1/44* (2006.01)
(52) U.S. Cl. ........ 318/786; 318/785; 318/781; 318/778; 318/767; 318/727
(58) Field of Classification Search .................. 318/786, 318/785, 781, 778, 767, 727
See application file for complete search history.

(56) References Cited

U.S. PATENT DOCUMENTS

| 4,204,425 | A | * | 5/1980 | Mallick, Jr. ............... 73/114.15 |
| 4,843,295 | A | * | 6/1989 | Thompson et al. ........... 318/786 |
| 5,280,227 | A | * | 1/1994 | Bashark ....................... 318/751 |
| 5,528,120 | A | * | 6/1996 | Brodetsky .................... 318/785 |

* cited by examiner

*Primary Examiner* — Bentsu Ro
*Assistant Examiner* — David Luo
(74) *Attorney, Agent, or Firm* — Design IP (57) ABSTRACT

An electronic relay for single phase induction motor, the electronic relay including a triac located between a start winding and a start capacitor of the single phase induction motor to control current flow of the start winding and an induced voltage detection circuit to detect an induced voltage of the start winding proportional to an angular velocity of the motor. The electronic relay is adapted to detect a zero-point voltage of a motor line voltage before start of the motor and to calculate an acceleration torque during start of the motor. The electronic relay is programmed to turn on the triac when the zero-point voltage of the motor line is detected and to turn off the triac when the acceleration torque begins decreasing.

13 Claims, 4 Drawing Sheets

METHOD FOR STARTING SINGLE PHASE INDUCTION MOTOR AND ELECTRONIC RELAY USING THE SAME

CROSS-REFERENCE TO RELATED APPLICATIONS

Korean Patent Application No. 10-2009-0068382, filed on Jul. 27, 2009, is incorporated herein by reference as if fully set forth.

BACKGROUND OF THE INVENTION

1. Field of the Invention

The present invention relates to a method for starting single phase induction motor and an electronic relay using the same, and more particularly, to a method for starting single phase induction motor and an electronic relay using the same, which model a start torque curve with an induced voltage to perform control in a programming scheme, and thus can minimize a start failure and increase compatibility in order for be applied to motors based on various standards.

2. Description of the Related Art

In a single phase induction motor, generally, a rotor magnetic field does not occur because a stator winding has a single phase, but once a rotor begins rotating, an induction torque occurs and thereby the rotor rotates at a synch speed according to the standing wave thereof. Accordingly, the single phase induction motor requires a start method for obtaining a start torque because the equilibrium state of a magnetic field is changed into a disequilibrium state at an initial state.

The single phase induction motor is classified into a split-phase motor, a capacitor motor and a shading-pole motor based on the start method for obtaining the start torque. The split-phase motor uses a start scheme that connects a start winding to a run winding in parallel and occurs a phase difference based on the impedance difference between the start winding and the run winding, thereby starting. The capacitor motor is a motor that obtains a start torque greater than that of the split-phase motor by inserting a capacitor into a start winding in series. The phase of a supply current is shifted by the capacitor that is inserted into the start winding and the supply current having the shifted phase flows through the start winding, and thus the equilibrium of an electromagnetic force is disrupted, thereby obtaining the start torque. Subsequently, when a rotor starts to rotate and an angular velocity increases to the certain number of rotation times, the capacitor is separated by a centrifugal switch and thereby the capacitor motor runs normally.

However, the mechanical centrifugal switch is vulnerable to vibration, and its characteristic is degraded due to mechanical/electrical abrasion that is caused by the occurrence of an arc when switching is frequently performed. Accordingly, an electronic relay is gradually used. An electronic relay for a single phase induction motor serially connects a power semiconductor switching device such as triac to a start winding and controls the semiconductor switching device through a control circuit, thereby enabling a current to flow in the start winding only upon start.

A related art electronic relay simply determines a start completion time with only the level of a voltage (which is induced to a start winding) to perform control, and thus compatibility decreases and a start failure rate is high because characteristic is changed according to the standards and disposition conditions of motors. In the related art electronic relay, moreover, because a control circuit for controlling the gate of a triac is configured with an analog circuit, the efficiency of an internal power source circuit decreases when requiring a large amount of current is consumed and the gate current of a relatively high capacity is required.

SUMMARY OF THE INVENTION

Accordingly, the present invention is directed to a method for starting single phase induction motor and an electronic relay using the same, which model a start torque curve with a voltage (which is induced to a start winding) to perform control in a programming scheme, minimizing a start failure.

The present invention is also directed to a method for starting single phase induction motor and an electronic relay using the same, which receive the induced voltage of a start winding, operate an induced voltage variation rate, determine that in which the start torque of the motor is the maximum and turn off a triac when the start torque begins decreasing, thereby increasing compatibility in order for be applied to motors based on various standards.

The present invention is also directed to a method for starting single phase induction motor and an electronic relay using the same, which correct a reverse run (which is caused by impulse) through restart that is performed by comparing the phase of a line voltage with the phase of the both-end voltage of a triac, and enable a momentary forward/reverse rotation when necessary.

The present invention is also directed to a method for starting single phase induction motor and an electronic relay using the same, which form the discharge path of a start capacitor even when a discharge resistor is not connected to a start capacitor, protecting a circuit.

According to an aspect of the present invention, there is provided a method for starting single phase induction motor including: turning on a semiconductor switching device to flow a current in a start winding, in a single phase induction motor in which a run winding and the start winding are connected in parallel via the semiconductor switching device; detecting an induced voltage proportional to an angular velocity of a rotor from the start winding, when a current flows in the start winding; receiving the detected induced voltage to calculate a variation rate of the induced voltage proportional to an acceleration torque, and storing the calculated variation rate; comparing the stored variation rate of the induced voltage, and determining a time when the variation rate of the induced voltage is the maximum as a time when a start torque is the maximum, when the variation rate of the induced voltage increases and then decreases; and turning off the semiconductor switching device to complete start, when the variation rate of the induced voltage begins decreasing after the determination.

According to another aspect of the present invention, there is provided an electronic relay for single phase induction motor including: a triac connected between a start winding and start capacitor of the single phase induction motor to control (break or connect) a current flow of the start winding; an induced voltage detection circuit detecting an induced voltage of the start winding proportional to an angular velocity of the motor; a window comparison circuit detecting a both-end voltage of the triac to detect a zero-point voltage of a motor line voltage before start and to detect a zero-point current of a start winding current during start; and a Micro Control Unit (MCU) turning on the triac at the zero-point voltage of the motor line voltage to begin starting according to a signal of the window comparison circuit, triggering a gate of the triac for a certain delay time at every zero-point current time of the start winding current to maintain a turn-on state of the triac according to the signal of the window comparison circuit during start, receiving the induced voltage of the start winding from the induced voltage detection circuit to calculate a variation rate of the induced voltage proportional to an acceleration torque of the motor during start, checking that in which a start torque is the maximum with that in which an acceleration torque is the maximum, and turning off the triac when the acceleration torque begins decreasing.

According to embodiments of the present invention, when a load torque and inertia are constant, the variation rate (dVs/dt) of the induced voltage of a start winding increases in proportion to the start torque of a motor. In embodiments of the present invention, accordingly, a voltage that is induced to a start winding W2 is inputted through the input port ADC1 of a micro control unit (MCU) and the variation rate of the induced voltage is operated, checking the occurrence time of the maximum torque during the start of the motor. By determining the decrease time of the start torque of the motor as a start completion time, a triac is turned off. According to embodiments of the present invention, a start failure can be minimized, and compatibility largely increases because of applying to all sorts of motors irrespective of the standards and kinds of motors. According to embodiments of the present invention, moreover, by performing a restart procedure through the comparison of the levels of induced voltages and the comparison of the phases of a line voltage and the both-end voltage of the triac after start completion, relatively more quick and accurate restart may be performed, a reverse run by impulse is corrected, and a momentary forward/reverse rotation may be performed.

The advantages, features and aspects of the present invention will become apparent from the following description of the embodiments with reference to the accompanying drawings, which is set forth hereinafter. However, the following embodiments are merely exemplified for describing the present invention, and should not be construed as limited to the embodiments set forth herein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
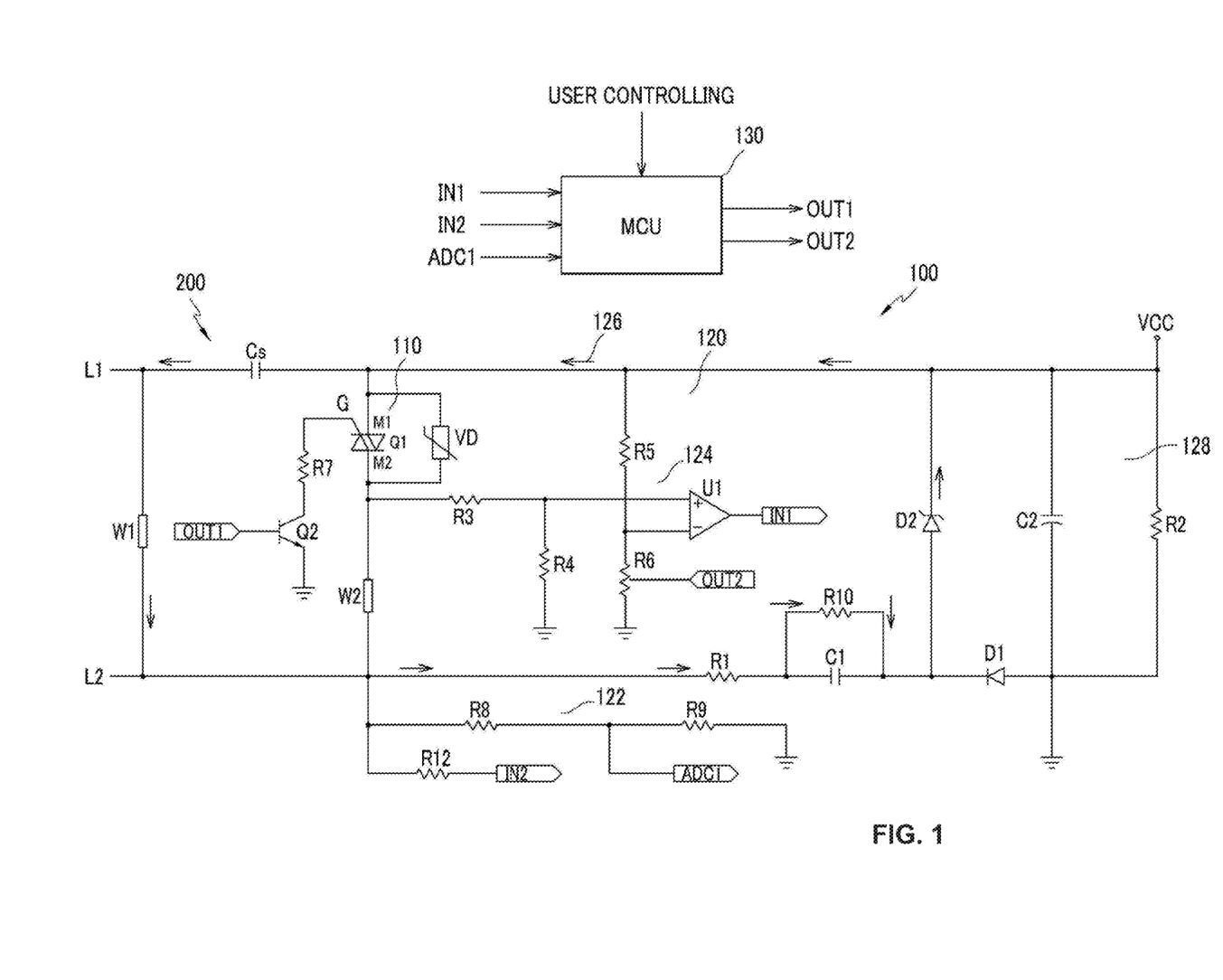
FIG. 1 is a circuit diagram illustrating a driving circuit of a single phase induction motor to which an electronic relay is applied, according to an embodiment of the present invention.

FIG. 1 is a circuit diagram illustrating a driving circuit of a single phase induction motor to which an electronic relay is applied, according to an embodiment of the present invention.

Referring to FIG. 1, a single phase induction motor 200 includes a rotor and a stator. A run winding 1W and a start winding W2 are wound around the rotor. In the case of a capacitor start motor, a start capacitor Cs is connected to the start winding W2 in series.

An electronic relay 100 according to an embodiment of the present invention includes a power semiconductor switching device 110, a micro control unit (MCU) 130, and a control circuit 120. The power semiconductor switching device 110 is serially connected to the start winding W2 and controls (for example, breaks or flows) a current that flows in the start winding W2. The MCU 130 controls a start function according to a control algorithm that calculates the variation rate of a voltage (which is induced to the start winding W2) to derive a start torque. The control circuit 120 senses the voltages of motor lines L1 and L2 and the induced voltage of the start winding W2 to provide the sensed voltages to the MCU 130, and controls the power semiconductor switching device 110 according to the control of the MCU 130. When start is completed by applying a power source to the single phase induction motor 200, the electronic relay 100 disconnects the start winding W2 from the power source lines L1 and L2. During the run of a motor, the electronic relay 100 senses the level of a voltage which is induced to the start winding W2 or the phase difference between a line voltage and the both-end voltage of the semiconductor switching device, and controls restart when necessary.

In an embodiment of the present invention, the power semiconductor switching device 110 uses a snubberless traic Q1. As illustrated in FIG. 1, the first port M1 of the triac Q1 is connected to the start capacitor Cs, and the second port M2 of the triac Q1 is connected to the start winding W2. The gate port G of the triac Q1 is connected to a transistor Q2, which is turned on/off according to the output OUT1 of the MCU 130 to generate a trigger signal, through a resistor R7.

Moreover, the control circuit 120 includes an induced voltage detection circuit 122, a window comparison circuit 124, a discharge circuit 126, and a power source circuit 128. The induced voltage detection circuit 122 drops a voltage that is induced to the start winding W2 and connects the dropped voltage to the input port ADC1 of the MCU 130. The window comparison circuit 124 detects a zero-point voltage and a zero-point current by the use of the both-end voltage of the triac Q1 and provides the detected voltage and current to the first input port IN1 of the MCU 130. The discharge circuit 126 provides a discharge path for the start capacitor Cs. The power source circuit 128 provides a power source to the internal circuit of the relay 100.

The induced voltage detection circuit 122 is configured with voltage drop resistors R8 and R9. As indicated by an arrow in FIG. 1, the discharge circuit 126 is configured with a closed circuit that includes a run winding W1 which is serially connected to the one end of the start capacitor Cs, a first resistor R1 which is serially connected to the run winding W1, a tenth resistor R10 which is serially connected to the first resistor R1, and a second diode D2, wherein the one end of the second diode D2 is serially connected to the tenth resistor R10 and the other end of the second diode D2 is serially connected to the other end of the start capacitor Cs. Such a discharge circuit 126 gradually discharges the charge voltage of the start capacitor Cs. Since the power source circuit 128 is a common circuit, its detailed description will be omitted.

As illustrated in FIG. 1, the window comparison circuit 124 includes voltage drop resistors R3 and R4, voltage drop resistors R5 and R6, and a comparator U1. The voltage drop resistors R3 and R4 drop the both-end voltage of the triac Q1 to connect the dropped voltage to the positive (+) port of the comparator U1. The voltage drop resistors R5 and R6 drop a power source voltage VCC to connect the dropped voltage to the negative (−) port of the comparator U1. The comparator U1 compares the both-end voltage of the triac Q1, which is inputted to the positive (+) port, with the reference voltage of the negative (−) port to output the comparison result to the first input port IN1 of the MCU 130. The variable resistor R6 connected to the negative (−) port of the comparator U1 is connected to the second output port OUT2 of the MCU 130, and thereby the reference voltage of the negative (−) port may vary according to the second output OUT2 of the MCU 130. In an embodiment of the present invention, the MCU 130 outputs a first reference voltage for detecting the zero-point voltages of the lines L1 and L2 to the negative (−) port of the comparator U1 through the second output port OUT2 when the triac Q1 is turned off, and it outputs a second reference voltage for detecting the zero-point current of a start winding current to the negative (−) port of the comparator U1 through the second output port OUT2 when the triac Q1 is turned on. At this point, since the comparator U1 uses the first reference voltage for detecting the zero-point voltage and the second reference voltage for detecting the zero-point current according to the control of the MCU 130, it configures the window comparison circuit 124 together with the both-end voltage input circuit of the triac Q1.

Furthermore, the MCU 130 for executing the inherent algorithm according to an embodiment of the present invention includes a digital input port, a digital output port, an analog input port, an analog output port, an electrically erasable programmable read-only memory (EEPROM), and a timer. In an embodiment of the present invention, as listed in the following Table 1, the MCU 130 controls total operations in connection with the control circuit 120.

TABLE 1

| Number | Port name | Signal characteristic | Function |
| --- | --- | --- | --- |
| 1 | IN1 | Digital input | Receive the output of a comparator U1 |
| 2 | IN2 | Digital input | Detect the phase of a line voltage in a split-phase start motor |
| 3 | ADC1 | Analog input | Input a start winding induced voltage |
| 4 | OUT1 | Digital output | Control the gate of a triac (turn on/off the triac) |
| 5 | OUT2 | Analog output | Control the reference voltage of a comparator U1 |

Referring to the Table 1, the MCU 130 receives the output of the comparator U1 through the first input port IN1, and detects the phase of the line voltage through the second input port IN2. The MCU 130 receives a voltage, which is induced to the start winding W2, through the input port ADC1, and derives a start torque with the variation rate of the induced voltage to determine a start completion time. The MCU 130 detects a zero voltage/current to efficiently control the gate of the triac Q1 through the first output port OUT1.

The electronic relay 100 operates through the organic connection of the control circuit 120 and the MCU 130, and therefore, for convenience, its operations will be described below with reference to FIGS. 2 to 5.

Figure 2:
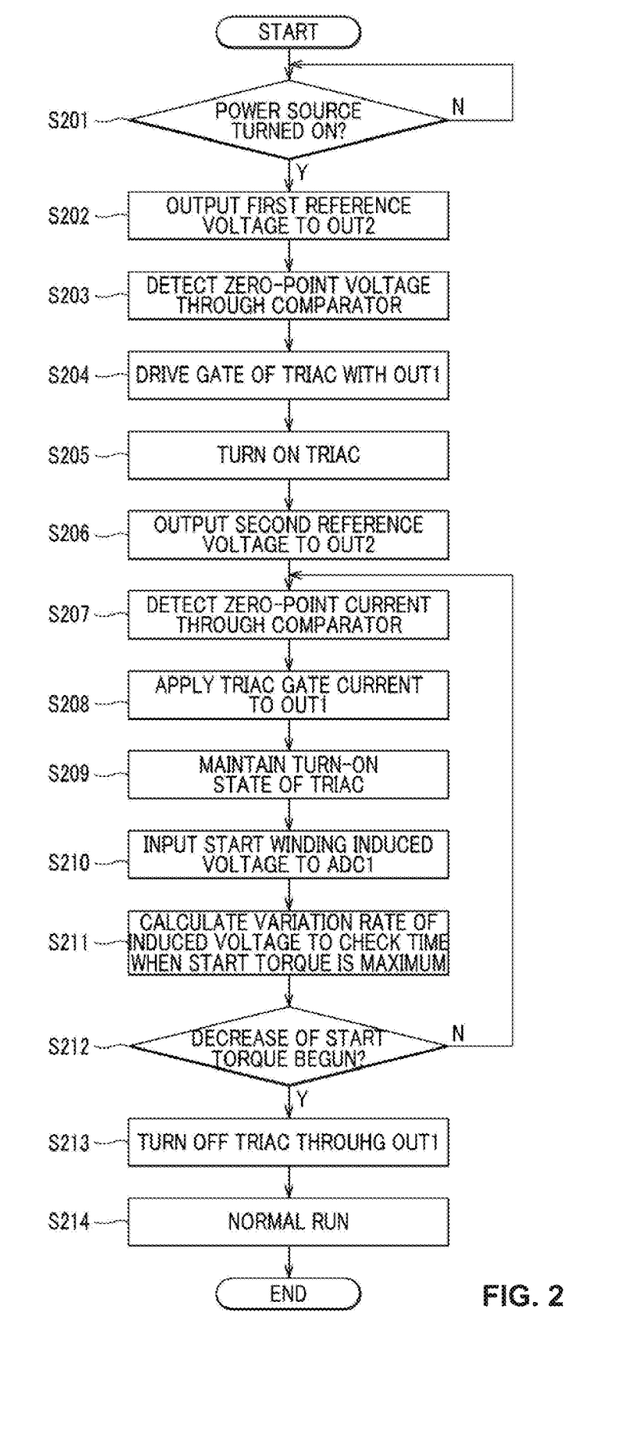
FIG. 2 is a flow chart illustrating an operation in which an MCU controls a start operation, according to an embodiment of the present invention.

FIG. 2 is a flow chart illustrating an operation in which the MCU controls a start operation, according to an embodiment of the present invention.

Referring to FIG. 2, when a line power source for driving the motor 200 is turned on at an initial stage, the power source circuit 128 supplies the power source voltage VCC to a relay circuit, and the MCU 130 determines whether the motor 200 is a capacitor start motor or a split-phase start motor that is connected to a start capacitor Cs. When the motor 200 is the capacitor start motor, the motor 200 outputs the first reference voltage as the reference voltage of the comparator U1 through the second output port OUT2. When the triac Q1 is turned off, the first reference voltage is a reference voltage for detecting the zero-point voltage of a motor line voltage, in operations S201 and S202.

The both-end voltage of the triac Q1 is dropped through the resistors R3 and R4 to become the input voltage of the comparator U1, and the divided voltage of the power source voltage VCC becomes the first reference voltage according to the output OUT2 of the MCU 130. The output of the comparator U1 is inputted to the input port IN1 of the MCU 130.

The MCU 130 senses the output signal of the comparator U1 through the input port IN1 to check the zero-point voltage of the both ends of the triac Q1, and a trigger pulse signal is outputted to the output port OUT1 for controlling the gate G of the triac Q1. When a gate current is applied to the gate G of the triac Q1 through the transistor Q2 and the resistor R7 (which configure a control circuit for controlling the gate G of the triac Q1) according to the output OUT1 of the MCU 130, the triac Q1 is turned on at a zero-point voltage. Accordingly, as a current having a phase that leads the phase of the run winding W1 flows in the start winding W2, a rotation power based on a phase difference is produced and thereby start is begun, in operations S204 and S205. At this point, in an embodiment of the present invention, because the triac Q1 is turned on in a zero-voltage state, the traic Q1 and peripheral circuits can be protected from an impulse current.

When a pulse higher than a trigger voltage is applied to the gate G of the traic Q1, the triac Q1 is turned on. The triac Q1 continuously maintains a turn-on state while a current is flowing between ports M1 and M2 thereof and then, when the current between the ports M1 and M2 becomes lower than the maintained current, the triac Q1 is turned off. Accordingly, when an alternating current (AC) current flows in the ports M1 and M2, since the triac Q1 is again turned off at the zero-point current of a current (which is produced at the every half cycle of an AC current) in operation characteristic, the gate G of the triac Q1 should be again triggered at the time for maintaining the turn-on state of the triac Q1.

In the electronic relay 100, accordingly, while the motor 200 is starting, the window comparison circuit 124 changes the signal of the MCU 130 at every half cycle in which a start winding current is closer to a zero-point current. Therefore, the MCU 130 applies a trigger current to the gate G of the triac Q1 through the output port OUT1 and the transistor Q2 to maintain the turn-on state of the triac Q1, in operations S206 to S209. In the control of the snubberless triac, particularly, the gate current level of the triac is an important factor for improving the inherent characteristic (dV/dt(commutation)) of the triac. In an embodiment of the present invention, therefore, by predicting the zero-point current of a start winding current and applying enough gate current to the triac Q1 only for a certain delay time, the electronic relay 100 can stably control the triac while minimizing internal power consumption thereof.

That is, the triac Q1 varies according to component characteristic and peripheral temperature between the ports M1 and M2 (which are the main contacts of the traic Q1) at every half cycle in which a start winding current traverses a zero-point current, in a turned-on state, wherein the voltage variation of about 1.0 to 1.5 V occurs. Accordingly, the electronic relay 100 predicts the zero-point current time of a start winding current through the both-end voltage variation of the triac Q1, and it applies an enough amount of current to the gate G of the triac Q1 for the minimum delay time to efficiently control the triac Q1 at the predicted time.

In FIG. 1, when the triac Q1 is in a turned-on state, the both-end voltage of the triac Q1 is dropped through the resistors R3 and R4 to become the input voltage of the positive (+) port of the comparator U1. The resistors R5 and R6 set the reference voltage of the negative (−) port of the comparator U1. The comparator U1 compares the input voltage of the positive (+) port with the reference voltage of the negative (−) voltage to sense the phase inversion of the triac Q1 (i.e., the zero-point voltage pass time of a motor line voltage before start, and the zero-point current pass time of a start winding current during start), and provides the sensed result to the MCU 130 through the input port IN1. At this point, most quickly predicting the zero-point current pass time of the start winding current and the variation section of the pass time is relatively more efficient for the control of the triac Q1. In an embodiment of the present invention, by using the resistor R6 as a variable resistor, the MCU 130 adjusts the high limit and low limit of the reference voltage of the negative (−) port of the comparator U1 according to the phase inversion of the start winding current that occurs at the every half cycle of an AC power source.

Moreover, when a varistor VD, in which an operation voltage is in accordance with a non-repetitive peak off-state voltage, is connected to the both-end ports M1 and M2 of the triac Q1 in parallel while the motor 200 is running, the triac Q1 and peripheral circuits can be protected from the both-end noise (for example, a surge voltage and an impulse voltage) of the triac Q1 and the charge voltage of the start capacitor.

When the single phase induction motor 200 begins starting and a rotator begins rotating, magnetic flux by a current flowing in a rotator winding is produced, and a voltage is induced to the start winding W2 by means of the magnetic flux. The induced voltage increases in proportion to an angular velocity and then becomes constant when the motor 200 is closer to a synch speed to complete start. In an embodiment of the present invention, the induced voltage of the start winding W2 is inputted to the analog input port ADC1 of the MCU 130 through the resistors R8 and R9 of the induced voltage detection circuit 122, and is converted into a digital value by the analog-to-digital converter of the MCU 130. The digital-converted induced voltage is stored in a flash memory of the MCU 130.

The MCU 130 calculates the variation rate of the induced voltage being proportional to the acceleration speed of the motor 200 to check the time in which the start torque of the motor 200 is the maximum, and when the start torque of the motor 200 begins decreasing rapidly, the MCU 130 limits the gate current of the triac Q1 through the resistor R7 and the transistor Q2 to turn off the triac Q1, thereby breaking the start winding W2 in operations 210 to S213. In a motor, generally, the maximum torque occurs at a time in which an angular velocity becomes 70% to 80% of a synch speed.

According to an embodiment of the present invention, relationships between a motor torque, a load torque, an acceleration torque and an induced voltage variation rate (dVs/dt) will be defined as follows. The following description will be made on a method for detecting the maximum torque necessary for the start control of the single phase induction motor 200 during start.

A current, which is applied to the run winding W1 and start winding W2 of a stator during start, produces a rotation magnetic field. When the rotation magnetic field passes a rotator, a voltage is produced in the rotator, and a current is produced in the rotator by the voltage of the rotator. At this point, a magnetic field is also produced in the periphery of the rotator, and a voltage is induced to the start winding W2 by the magnetic field. Herein, the induced voltage (Vs) is also called a speed voltage because the level of the induced voltage (Vs) is proportional to the angular velocity (ω) of the rotator.

Generally, a motor torque is proportional to the sum of a load torque and an acceleration torque as expressed in Equation (1) below.

motor torque=load torque+acceleration torque $$\text{acceleration torque}=J\times(d\omega/dt)=(dVs/dt) \qquad (1)$$

where dJ/dt=0, ω=Vs, ω is an angular velocity, J is an inertia moment, Vs is a speed voltage, and dVs/dt is a speed-voltage variation rate.

Accordingly, when the load torque and the inertia moment are constant, the start torque of the motor increases in proportion to the acceleration torque or induced voltage variation rate of the motor 200. The MCU 130 receives a voltage induced to the start winding W2 through the input port ADC1 to calculate the variation rate of the induced voltage, and thus the occurrence time of the maximum torque can be checked while the motor 200 is starting. Accordingly, the decrease time of the start torque of the motor 200 can also be sensed accurately.

A stator magnetic field (Φ) increases in proportion to the voltage of the stator or a motor voltage as expressed in Equation (2) below. A rotor induced voltage (E) is proportional to the intensity of the stator magnetic field and the angular velocity (N) of the rotor.

$$E=K\phi N=kVN \qquad (2)$$

As described above, if it is assumed that the induced voltage (E') of the start winding W2 is proportional to a rotor magnetic field (Φ') and a rotor speed (N) and a specific constant (k) based on the structure of the motor is constant, the start winding induced voltage (E') is expressed as Equation (3) below.

$$E'=k\Phi'N=kEN=K^2VN^2,$$

$$N^2=(1/k^2)(E'/V) \qquad (3)$$

Accordingly, the speed (N) of the motor (i.e., the angular velocity (N) of the rotator) is proportional to a square root (which is "start winding induced voltage/motor line voltage") as expressed in Equation (4) below. As described below, by monitoring the induced voltage of the start winding, restart can be controlled.

$$N=\sqrt{E'/V} \qquad (4)$$

Figure 3:
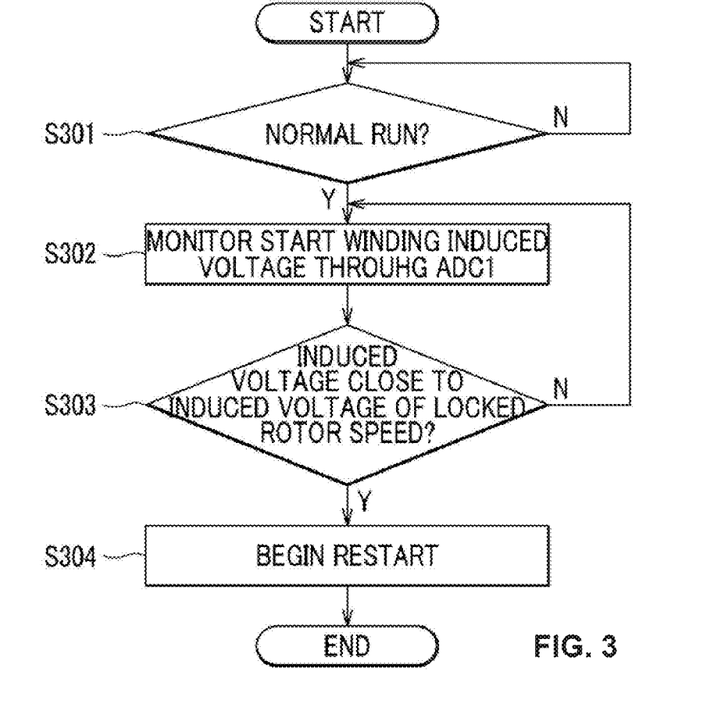
FIG. 3 is a flow chart illustrating an operation in which the MCU compares the level of an induced voltage to control restart, according to an embodiment of the present invention.
Figure 4:
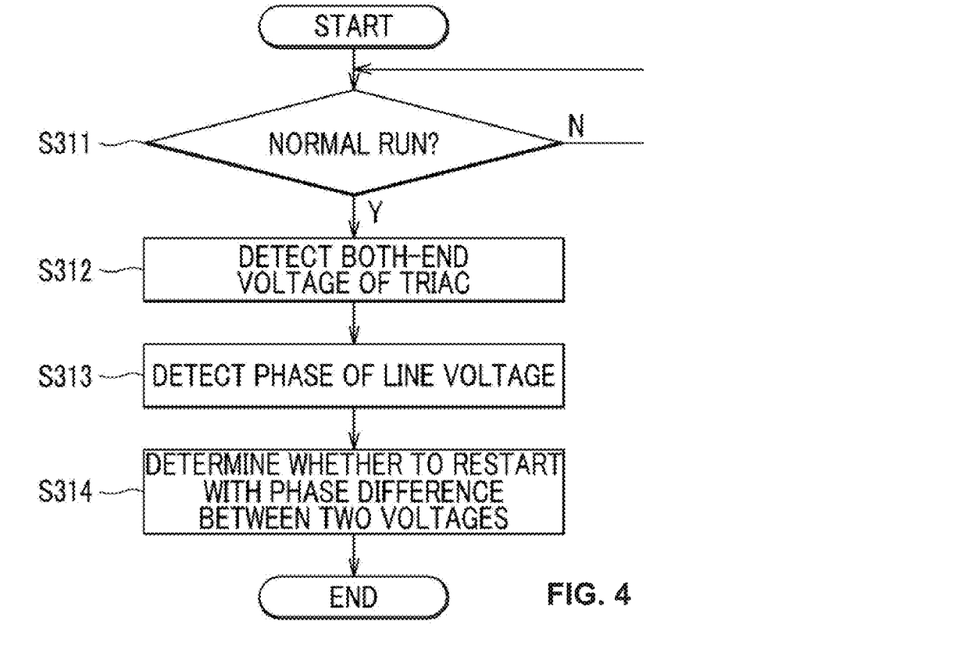
FIG. 4 is a flow chart illustrating an operation in which the MCU compares the phase of a line voltage and the phase of the both-end voltage of a triac to control restart, according to an embodiment of the present invention.

FIG. 3 is a flow chart illustrating an operation in which the MCU compares the level of the induced voltage to control restart, according to an embodiment of the present invention. FIG. 4 is a flow chart illustrating an operation in which the MCU compares the phase of a line voltage and the phase of the both-end voltage of the triac to control restart, according to an embodiment of the present invention.

Referring to FIG. 3, after the start of the motor 200 is completed, the MCU 130 receives the start winding induced voltage (E') being proportional to the angular velocity through the input port ADC1 to perform monitoring when the motor 200 normally runs, in operations S301 and S302. The MCU 130 continuously checks the level of the induced voltage (E'). When the level of the induced voltage is closer to the induced voltage of a locked rotor speed, the MCU 130 determines as that in which the speed of the motor 200 becomes close to the locked rotor speed, and the MCU 130 controls the triac Q1 to perform restart through the above-described operations, in operations S303 and S304.

The vector sum of the induced voltage and the power source voltage is applied across the both ends of the triac Q1. In a normal run state, therefore, the phase of the both-end voltage of the triac Q1 lags behind the phase of the power source voltage. In the stop (i.e., locked) state of the motor 200, since a phase difference is minimized, the MCU 130 may accumulatively store the phase difference between the both-end voltage of the triac Q1 and the line voltage and then may check the change of the phase difference to perform restart.

Referring to FIG. 4, the MCU 130 detects the phase of the both-end voltage of the triac Q1 through the input port IN1, detects the phase of the line voltage through the input port IN1, and thereby determines whether to restart with the phase difference between the both-end voltage of the triac Q1 and the line voltage, in operations S311 to S314. For example, the MCU 130 continuously senses the phase difference between the both-end voltage of the triac Q1 and the line voltage, and then when the phase difference between the two voltages decreases to a value less than a certain value, the MCU 130 triggers the gate of the triac Q1 to restart.

When the phase of the both-end voltage of the triac Q1 leads the phase of the line voltage, the MCU 130 may determine as the switching of a forward/reverse wiring or a reverse run due to impulse and may restart. That is, when the forward/reverse wiring is switched, a momentary forward/reverse rotation having no arc may be performed. When an undesired reverse run due to impulse, the MCU 130 may return the run of the motor 200 to a forward run.

Figure 5:
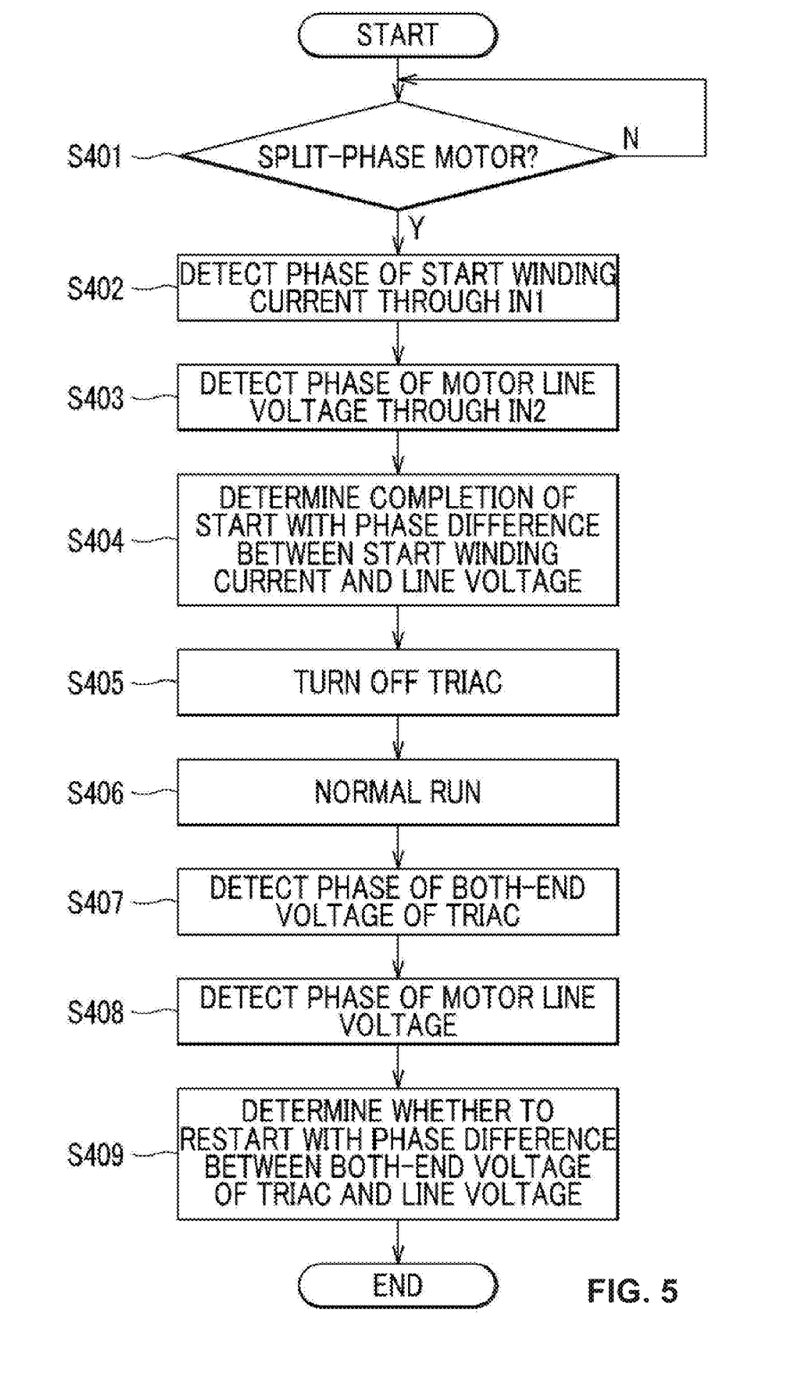
FIG. 5 is a flow chart illustrating start and restart operations by applying the electronic relay to a split-phase motor having no start capacitor, according to another embodiment of the present invention.

FIG. 5 is a flow chart illustrating start and restart operations by applying the electronic relay to a split-phase motor having no start capacitor, according to another embodiment of the present invention.

It is difficult to detect the induced voltage of the start winding W2 during restart because the split-phase motor does not use a start capacitor, and therefore it is difficult that the split-phase motor checks a time when a start torque is the maximum, in the method of a capacitor motor, to predict a start completion time. Accordingly, when the electronic relay 100 is applied to the split-phase motor, a locked rotor current is greater by five to seven orders of magnitude than a run current. When start is completed, the MCU 130 controls the triac Q1 at a time when a current rapidly decreases and thereby the phase difference between the motor line voltage and the start winding current rapidly increases.

Referring to FIG. 5, in the case of the split-phase motor, the phase difference of about 20° to 30° occurs between the motor line voltage and the start winding current according to a winding scheme when the triac Q1 is turned on and the motor 200 begins starting.

When the angular speed of the motor 200 reaches about 70% to 80% during start, the start winding current decreases due to a voltage that is induced to the start winding W2, and thus the phase difference between the motor line voltage and the start winding current increases rapidly. Because the start winding current is in-phase with the both-end voltage of the triac Q1, the phase of the start winding current may be detected with the both-end voltage of the triac Q1.

Accordingly, the MCU 130 receives the output of the comparator U1 corresponding to the both-end voltage of the triac Q1 through the input port IN1 to detect the current phase of the start winding W2, detects the phase of the motor line voltage though the input port IN2, and checks a time when the phase difference between the start winding current and the line voltage increases. When the change of the phase difference becomes slow, the MCU 130 predicts as the completion of start to turn off the triac Q1 within a certain delay time, in operations S401 to S405. That is, the phase inversion of the start winding current is performed through the window comparison circuit 124 that is used as a zero-point current/voltage detection circuit, and a zero-point voltage corresponding to the phase inversion of the line voltage is inputted to the input port IN2 of the MCU 130 through a current limiting resistor R12.

Moreover, when a phase difference does not occur for longer than a certain time during start, the MCU 130 determines as that in which the motor 200 is in a locked state during start and instantly turns off the triac Q1, thereby protecting the start winding W2.

Although a motor speed sense scheme using the detection of an induced voltage may be applied for the restart of the motor 200 during a normal run, like a capacitor start motor, a low-cost circuit may be configured using the following phase difference comparison scheme without a separate analog-to-digital converter.

That is, the vector sum of the motor line voltage and the induced voltage is applied across the both ends of the triac Q1 while the motor 200 is running, and thus a phase difference with respect to the line voltage occurs. However, when the angular velocity of the motor 200 decreases due to reasons such as a locked load, the phase difference between the both-end voltage of the triac Q1 and the line voltage decreases. Accordingly, the phase difference between the both-end voltage of the triac Q1 and the line voltage is continuously sensed, and when the phase difference between the two voltages decreases to a value less than a certain value, the MCU 130 triggers the gate of the triac Q1 to restart, in operations S406 to S409.

In this way, in the case of the split-phase motor, the electronic relay 100 senses the phase difference between the motor line voltage and the start winding current during start, and senses the phase difference between the motor line voltage and the both-end voltage of the triac Q1 during run, thereby restarting when necessary.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for starting single phase induction motor, the method comprising:
   turning on a semiconductor switching device to flow a current in a start winding, in a single phase induction motor in which a run winding and the start winding are connected in parallel via the semiconductor switching device;
   detecting an induced voltage proportional to an angular velocity of a rotor from the start winding, when a current flows in the start winding;
   receiving the detected induced voltage to calculate a variation rate of the induced voltage proportional to an acceleration torque, and storing the calculated variation rate;
   comparing the stored variation rate of the induced voltage, and determining a time when the variation rate of the induced voltage is the maximum as a time when a start torque is the maximum, when the variation rate of the induced voltage increases and then decreases; and
   turning off the semiconductor switching device to complete start, when the variation rate of the induced voltage begins decreasing after the determination.

2. The method of claim 1, wherein:
the semiconductor switching device is a triac, and a gate of the triac is triggered for a certain delay time at every zero-point current time of the start winding current to efficiently maintain an turn-on state of the triac.

3. The method of claim 2, further comprising restarting the motor when the induced voltage decreases to a value less than a certain value or a phase difference between a both-end voltage of the triac and a line voltage decreases to a value less than a certain value, after completion of start.

4. The method of claim 2, further comprising determining as an undesired reverse run state due to a momentary forward/reverse rotation or external impulse when a phase of a both-end voltage of the triac leads a phase of a line voltage after completion of start, and restarting the motor.

5. The method of claim 2, wherein when the single phase induction motor is a split-phase start motor,
sensing a phase difference between a motor line voltage and a start winding current to check a time when the phase difference between the motor line voltage and the start winding current increases, and predicting as completion of start to turn off the triac within a certain delay time when a change of the phase difference becomes slow, while the motor is starting, and
sensing a phase difference between the motor line voltage and a both-end voltage of the triac, and restarting the motor when the phase difference between the two voltages decreases to a value less than a certain value, while the motor is running.

6. An electronic relay for single phase induction motor, the electronic relay comprising:
a triac connected between a start winding and start capacitor of the single phase induction motor to control (break or connect) a current flow of the start winding;
an induced voltage detection circuit detecting an induced voltage of the start winding proportional to an angular velocity of the motor;
a window comparison circuit detecting a both-end voltage of the triac to detect a zero-point voltage of a motor line voltage before start and to detect a zero-point current of a start winding current during start; and
a Micro Control Unit (MCU) turning on the triac at the zero-point voltage of the motor line voltage to begin starting according to a signal of the window comparison circuit, triggering a gate of the triac for a certain delay time at every zero-point current time of the start winding current to maintain a turn-on state of the triac according to the signal of the window comparison circuit during start, receiving the induced voltage of the start winding from the induced voltage detection circuit to calculate a variation rate of the induced voltage proportional to an acceleration torque of the motor during start, checking that in which a start torque is the maximum with that in which an acceleration torque is the maximum, and turning off the triac when the acceleration torque begins decreasing.

7. The electronic relay of claim 6, wherein:
the MCU provides a first reference voltage to the window comparison circuit to compare the first reference voltage with the both-end voltage of the triac before start, and controls the gate of the triac to turn on the triac when the window comparison circuit detects a zero-point voltage, and
when a current flows in the start winding, for the window comparison circuit to detect the zero-point current of the start winding current produced at every half cycle of an Alternating Current (AC) power source, the MCU provides a second reference voltage having a next phase to the window comparison circuit to compare the second reference voltage with the both-end voltage of the triac, recognizes as a zero-point time of the start winding current, and applies a current to the gate of the triac for a time in which a phase inversion of a start current is completed (i.e., a production time of the zero-point current) to efficiently control a turn-on state of the triac.

8. The electronic relay of claim 6, wherein the electronic relay provides a discharge circuit for discharging a charge voltage of the start capacitor to discharge the start capacitor through an internal power source circuit without a separate discharge resistor.

9. The electronic relay of claim 8, wherein the discharge circuit is a closed circuit,
wherein the closed circuit comprises:
a run winding serially connected to a one end of the start capacitor;
a first resistor R1 serially connected to the run winding;
a tenth resistor R10 serially connected to the first resistor R1; and
a second diode D2 connected to the tenth resistor R10 and the start capacitor, wherein a one end of the second diode D2 is serially connected to the tenth resistor R10 and another end of the second diode D2 is serially connected to another end of the start capacitor.

10. The electronic relay of claim 6, wherein a varistor is connected to the both ends of the triac in parallel to protect the triac from a charge voltage and a surge voltage or impulse.

11. An electronic relay in a split-phase start single-phase induction motor in which a run winding and a start winding are connected in parallel, the electronic relay comprising:
a triac serially connected to the start winding to control (break or connect) a flow of a current according to a gate signal;
a window comparison circuit detecting a phase inversion (i.e., a zero-point current) of a start winding current;
a current limiting resistor R12 detecting a phase inversion (zero-point voltage) of a line voltage; and
a Micro Control Unit (MCU) receiving a both-end voltage of the triac through the window comparison circuit to detect a current phase of the start winding, detecting a phase of a motor line voltage through the current limiting resistor, checking a time when a phase difference between the start winding current and the line voltage increases, and predicting as completion of start to turn off the triac within a certain delay time when a change of the phase difference becomes slow.

12. The electronic relay of claim 11, wherein the MCU senses "a zero voltage of a both-end voltage of the start winding" being "a phase inversion of the line voltage" to initialize an internal timer while the motor is starting, fetching a value of the timer to calculate the phase difference between the line voltage and the start winding current when sensing "a variation of the both-end voltage of the triac" which is in-phase with "a phase inversion of the start winding current" occurring at every half cycle of an Alternating Current (AC) power source, continuously storing a change of the phase difference in an internal memory, comparing the phase difference with when the motor is locked to check relatively rapid increase when a start torque of the motor increases and thereby an angular velocity of the motor relatively rapidly increases to lead to a decrease of a current, and turning off the triac to break a start winding circuit after a certain operation delay time elapses.

13. The electronic relay of claim 11, wherein the MCU continuously senses the phase difference between the both-end voltage of the triac and the line voltage, and triggers the gate of the triac to restart when the phase difference between the two voltages decreases to a value less than a certain value.

* * * * *